United States Patent [19]

Fox

[11] 4,157,797

[45] Jun. 12, 1979

[54] SEATING ASSEMBLY FOR AIRCRAFT

[76] Inventor: Anthony Fox, 8306 Queen Ave. South, Minneapolis, Minn. 55431

[21] Appl. No.: 852,217

[22] Filed: Nov. 17, 1977

[51] Int. Cl.² ............................................... B64D 11/06
[52] U.S. Cl. ............................. 244/122 R; 296/65 R; 297/243; 297/332
[58] Field of Search ............ 244/122 R, 118 P, 137 P, 244/118 R; 297/332-335, 344, 243; 248/430; 296/64, 65 R, 68; 105/34 S

[56] References Cited

U.S. PATENT DOCUMENTS

| 1,682,989 | 9/1928 | Smelker | 296/68 |
| 1,922,582 | 8/1933 | Goodrich | 297/243 |
| 2,685,913 | 8/1954 | Schlueter | 297/332 |
| 2,735,476 | 2/1956 | Fieber | 244/122 R |
| 2,971,566 | 2/1961 | Negroni | 244/122 R |
| 3,222,106 | 12/1965 | Stout | 297/332 |
| 3,744,843 | 7/1973 | Barecki et al. | 297/332 |
| 3,986,459 | 10/1976 | Riley | 244/118 P |

Primary Examiner—Galen L. Barefoot
Attorney, Agent, or Firm—Orrin M. Haugen; Thomas J. Nikolai

[57] ABSTRACT

An aircraft seating arrangement for an aircraft in which the seats for the pilot and passengers are disposed on first and second pairs of longitudinally extending rails in a fashion that permits the seated occupant to position his seat at a desired location along the fuselage of the aircraft. The rails or tracks are disposed in the floor of the fuselage and roller members cooperate with the parallel tracks and with the seat frames to facilitate sliding the seats back and forth along the rails or tracks. A suitable detent is provided for locking the seat with respect to the rails at the desired location. Also, provision is made for rotating the seat cushion assembly from a normal, horizontal orientation to a substantially vertical orientation when a latching device is released.

3 Claims, 8 Drawing Figures

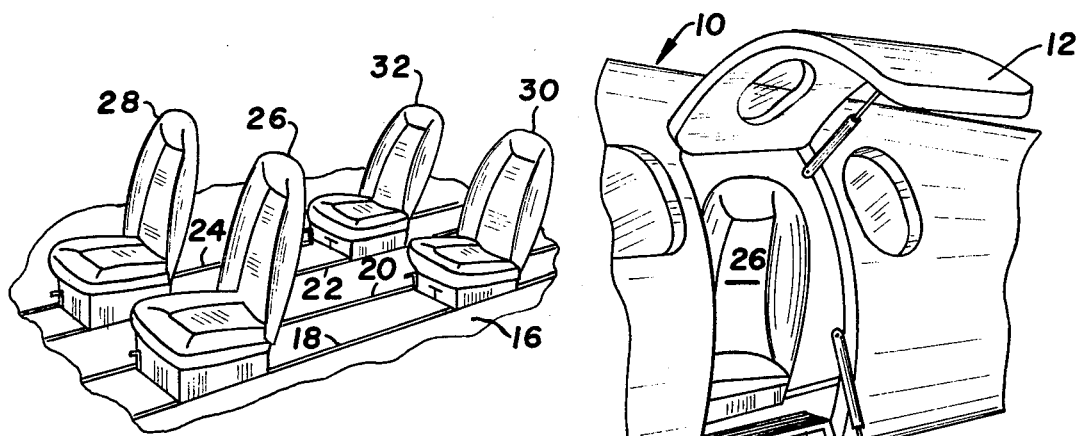
FIG. 2
FIG. 1
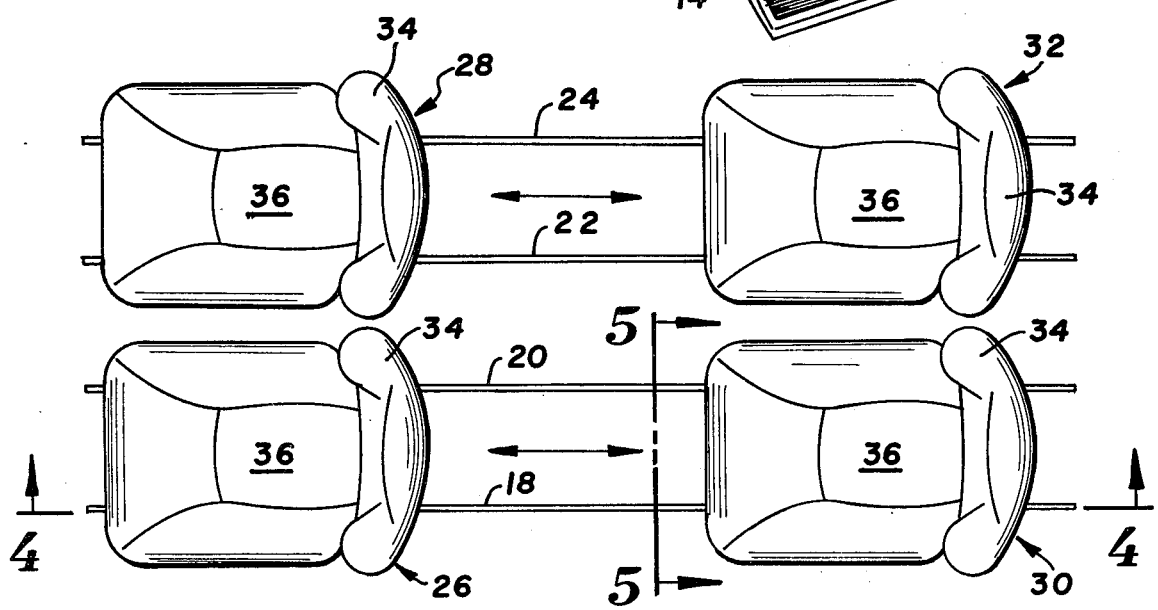
FIG. 3
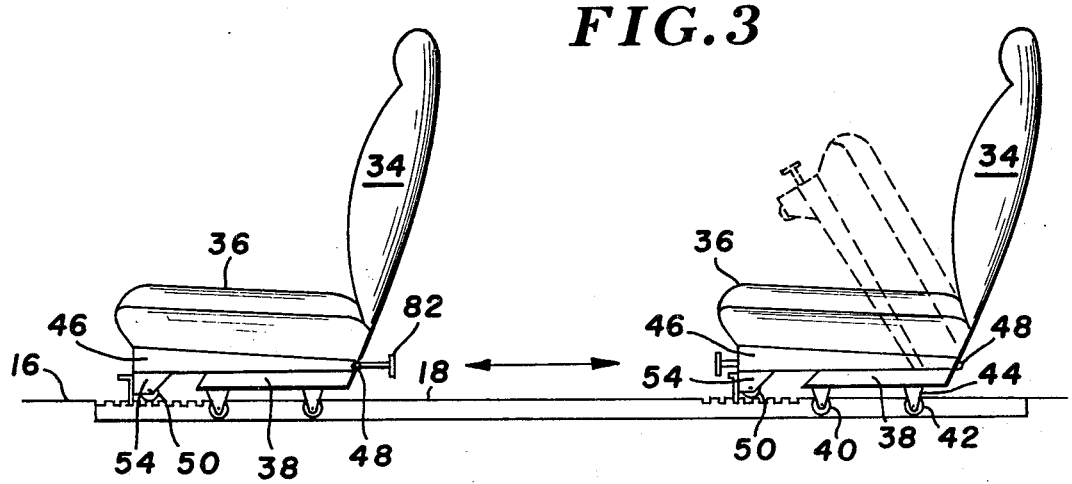
FIG. 4

//]:#

SEATING ASSEMBLY FOR AIRCRAFT

BACKGROUND OF THE INVENTION

This invention relates generally to seating arrangements for aircraft and more specifically to the design of a seating system which facilitates ingress and egress of a pilot and his passengers through a relatively small door leading to a relatively small passenger compartment.

Most aircraft designed for private or non-commercial use tend to be relatively small and are arranged to carry a limited number of passengers in addition to the pilot. In such aircraft, the passenger and pilot compartment are somewhat confining and are generally of a height which would not permit an adult to stand erect. Then too, the door leading to the passenger compartment is quite small which leads to difficulty during entry and egress. For example, in the aircraft for which the instant invention has been specifically designed, the outside diameter of the fuselage in the neighborhood of the passenger compartment is only 55 inches and the doorway is only about 42 inches high by 24 inches wide. Notwithstanding these rather small dimensions, entry into and egress from the aircraft can be accomplished comfortably and gracefully due to the manner in which the seating system is designed.

SUMMARY OF THE INVENTION

In accordance with the teachings of the present invention, first and second pairs of parallel tracks or rails are mounted in or on the floor of the aircraft fuselage and extend longitudinally through the pilot and passenger compartment on opposite sides of a center aisle. Mounted on these tracks for longitudinal travel therealong are a plurality of seats including a pilot's seat which is disposed in the forward left-hand side of the passenger compartment, a passenger seat which is next to the pilot's seat in the forwad right-hand portion of the fuselage and at least two other passenger seats which are aligned along the left and right sets of tracks behind the aforementioned front seats. On the underside of the seat frame assemblies are roller members which cooperate with the tracks to facilitate translation of the seats individually along their associated tracks. Means are provided for locking the seat assemblies to the track after the occupants have boarded and prior to takeoff.

A further feature to the seating arrangement of the present invention resides in the fact that it is possible to lift up the generally horizontal seat cushions so that they abut the backrest of the seat assembly to thereby allow front and rear seats to be brought closer together such that a front seat occupant may more readily exit from the aircraft or to allow more easy loading of baggage in a space within the fuselage located rearward of the rearmost row of seats.

It is accordingly a principal object of the present invention to provide a new and improved seating arrangement for small, privately-owned aircraft.

It is another object of the invention to provide a seating arrangement for small aircraft such that entry and egress by the pilot and passengers is facilitated.

Still another object of the invention is to provide a seating arrangement in which the individual seats are mounted upon longitudinally extending parallel rails in a manner which permits the seats to be individually translated forward or rearward with respect to the entry/exit doorway.

A still further object of the invention is to provide a seating system in which the individual seat assemblies may be securely locked to their associated rails.

Yet still another object of the invention is to provide an aircraft seat in which the generally horizontal frame assembly and seat cushion may be rotated up against its backrest to permit further travel of the remaining seats.

These and other objects and advantages of the present invention will become more apparent from the following detailed description of the preferred embodiment when considered in conjunction with the accompanying drawings in which like numerals in the several views depict corresponding parts.

DESCRIPTION OF THE DRAWINGS

FIG. 1 is a perspective view of a portion of the aircraft showing the manner in which a person may enter into or exit from the passenger/pilot compartment;

FIG. 2 is a perspective view of the seating arrangement contained within the fuselage of the aircraft;

FIG. 3 is an enlarged plan view of the seating arrangement of FIG. 2;

FIG. 4 is a side elevation of the seating arrangement;

DESCRIPTION OF THE PREFERRED EMBODIMENT

Figure 5:
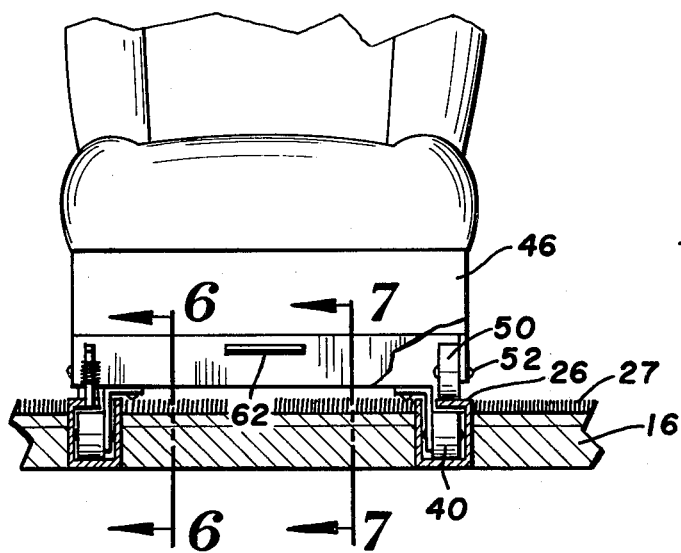
FIG. 5 is a cross-sectional view taken along the lines 5—5 in FIG. 3.

With reference to FIG. 1, there is indicated generally by numeral 10 the fuselage of a small aircraft in which the present invention may find application. Formed in the side of the aircraft is a generally rectangular doorway which is adapted to be sealed by clam shell-type door members 12 and 14. Typically, the diameter of the fuselage in the neighborhood of the doorway may be 55 inches while the doorway itself may be approximately 42 inches by 24 inches. The doorway is located behind the position normally occupied by the pilot's seat and in proximity to the rear passenger's seat.

With reference to FIG. 2, there is indicated by numeral 16 a portion of the floor of the passenger compartment of the aircraft and mounted on or recessed within the floor 16 is a first pair of rails or tracks including tracks 18 and 20 and a second pair including the tracks 22 and 24. The pilot's seat is identified by numeral 26, the front passenger's seat by numeral 28 and the rear passenger seats by numerals 30 and 32 respectively. As will be more fully explained hereinbelow, the seats 26-30 are mounted for longitudinal motion back and forth along the associated rails or tracks 18-20 and 22-24. It is also to be noted that the tracks extend a predetermined distance forward and rearward of the entrance and exit doorway of the aircraft.

As is illustrated in the plan view of FIG. 3, each of the seats includes a backrest portion 34 and a generally horizontally disposed seat cushion 36.

Figure 8:
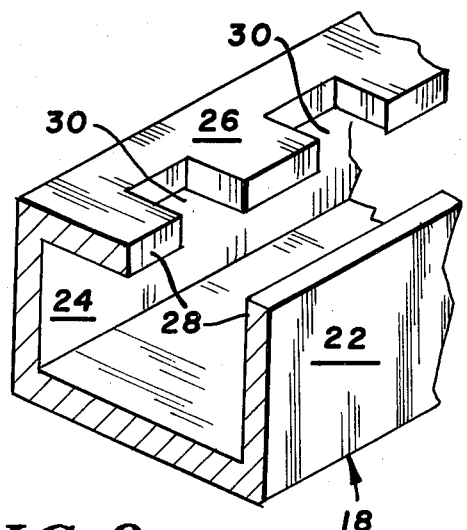
FIG. 8 is an enlarged, partial, cross-sectional view of the track employed.

Next, with reference to the side view of FIG. 4, it can be seen that the track 18 is recessed within the floor 16, the track 18 being an elongated tubular member having a generally rectangular cross-section as can best be seen in the enlarged perspective view of FIG. 8. The tracks 18-20 and 22-24 are identical in construction. With continued reference to FIG. 8, the track 18 has a bottom wall 20, side walls 22 and 24 and a top wall 26 which has a longitudinally extending slot 28 formed therein in proximity to the side wall 22. Also formed in the top wall 26 of the tubular track 18 are a plurality of laterally extending notches 30-30 which communicate with the longitudinal slot 28 and pass entirely through the top wall 26. The outer surface of the top wall 26 is preferably flush with the upper surface of the floor carpeting 27.

Figure 6:
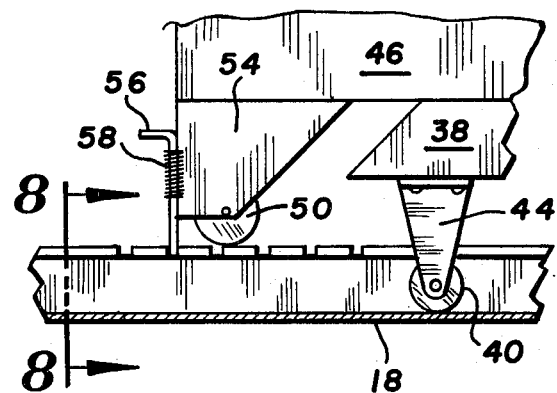
FIG. 6 is a partial cross-sectional view taken along the lines 6—6 in FIG. 5.

With reference to FIGS. 4-6, it can be seen that the seat frame assembly comprises a first platform 38 which is substantially rectangular in shape and which has front and rear wheels or castors 40 and 42 depending from the lower surface thereof on both side edges thereof, the wheels being supported by brackets 44 which are affixed to the under surface of the platform 38. The brackets 44 are designed to pass through the slot 28 formed in the rectangular cross-sectioned tubular track 18 and the wheels 40 and 42 are offset outwardly from the brackets so as to ride between the bottom surface 20 and the top surface 26 of the track.

The seat frame assembly further includes a second platform member 46 which, when the seat is in its normal position, overlays the platform 38. The platform 46 is secured at the rear edge thereof to the platform 38 by means of a hinge 48. A suitable spring member (not shown) is operatively disposed between the platforms 38 and 46 so as to normally urge the horizontal seat cushion 36 into the orientation depicted by the phantom lines in FIG. 4. As will be later explained, the platform 46 is held in its generally horizontal position, parallel to the platform 38 by means of a releasable latch.

Located at the bottom front edge of the platform 46 and at the edge corners thereof are rollers or castor wheels 50. The wheels 50 are journaled for rotation about an axle 52 which passes through a downwardly extending bracket 54 secured to the underside of the platform 46. The arrangement of the platform 46 and its brackets 54 are such that the wheel 50 rides upon the upper outer surface 26 of the track 18 when the castors secured to the lower platform 38 are contained within the confines of the track 18, as previously described.

As can best be seen in FIG. 6, there is attached to the front edge of the upper platform 46 a latch pin 56 which is normally biased downwardly into one of the notches 30 formed in the track 18 by means of a spring 58. An upward force on the latch pin releases the lower end thereof from its position in engagement with one of the notches 30 so that the pilot or passenger may reposition the entire seat assembly laterally with respect to the track on which it rides. Releasing the latch pin 56 again locks the seat assembly to the rail, once a desired position has been reached.

Figure 7:
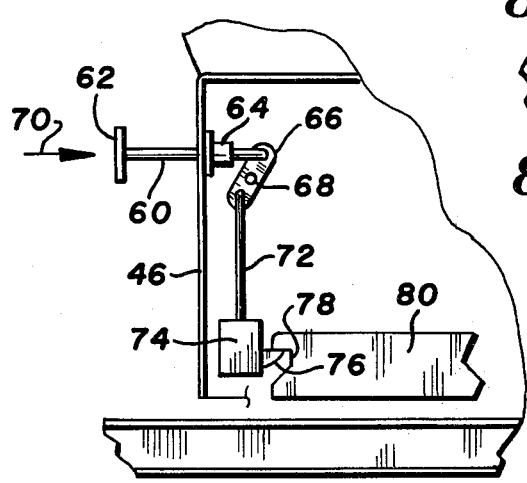
FIG. 7 is a cross-sectional view taken along the lines 7—7 in FIG. 6 showing the details of the seat latching arrangement.

With particular reference to FIGS. 4, 5 and 7, there is illustrated a seat trip mechanism which, when operated, allows the upper platform 46 to which the seat cushion 36 is attached to rotate upward against the seat back 34 abut the hinge 48, the rotational force being provided by the aforementioned spring (not shown). More specifically, centrally located in the front face of the upper platform 46 is an aperture having a rod 60 passing therethrough. A striking plate 62 is connected to the end of the rod which is exposed outside of the confines of the upper platform 46. A bushing 64 is provided for additional support to the rod 60 to ensure straight line motion when a force is applied to the striking plate 62. A linkage 66 is pivotally mounted with respect to the upper platform 46 so as to rotate about a central axis 68 when a force is applied in the general direction of the arrow 70. Rotation of the link 66 in the manner indicated applies a lifting force to a pin member 72 which operates through a spring latch mechanism 74 to withdraw the latch barb 76 from its position in engagement with a notch 78 formed in the end of the latching bar 80 which is structurally connected to the lower seat assembly platform 38.

OPERATION

Now that the details of the constructiion of the seat assembly of the preferred embodiment has been described in detail, consideration will be next given to he mode of operation.

It will be assumed that the last person who has exited from the aircraft was the pilot and that preparations are being made for a subsequent flight. The clam shell doors 12 and 14 will be opened and the pilot seat 26 will have been moved to a position adjacent to the doorway opening. The pilot then enters the aircraft, seats himself in the chair 26 and pulls up on the seat locking latch 56. By manipulating his legs, he is able to scoot the pilot seat 26 forward into the proper operating with respect to the airplane control structures. By releasing the latch 56, it will pass through a notch 30 provided in the upper track surface 26 to firmly lock the seat in this position. Next, the pilot may reach over to unlatch the seat 28 and shove it rearward towards the doorway. A passenger may then enter through the doorway, seat himself in the chair 28 and by manipulating the latch 56, he too may reposition the chair 28 in the forward position in the passenger compartment. A rear seat passenger may next reach through the doorway and release the track locking latch 56 on the seat 30 and slide it forward in abutting relationship to the pilot seat 26. Thus, the seat 30 is clear of the doorway and baggage may be loaded into the baggage compartment which is in an area behind the normal position of the rearmost seats 30 and 32. The second passenger may then enter the aircraft and seat himself in the chair 32 and reach forward to release the latch on the chair 30 and slide it to its normal position with respect to the doorway opening. The third passenger may then enter the aircraft and seat himself in the chair 30.

Upon arrival at the destination, the pilot and his passengers may alight from the aircraft in the following fashion. The clam shell doors 12 and 14 will again be opened and the passenger occupying seat 30 may alight through the doorway. The passenger occupying seat 32 may release the latch 56 and reposition the seat 30 rearward of the doorway along the tracks 18 and 20 so as to provide an unobstructed path to the doorway. The passenger in seat 28 may then release his seat latch and use his legs to propel the seat 28 rearward until the bumper member 82 mounted on the rear surface of the seat 28 abuts the latch striking plate 62. The rod 60 is then moved inward with respect to the seat frame assembly of the chair 32 and its latch 76 is released such that the seat cushion portion 36 of the chair 32 tilts upward to the position illustrated by the phantom lines in FIG. 4. Once the seat has been tripped in the fashion indicated, further clearance is provided for continued rearward motion of the front seat 28 such that the passenger occupying this seat may easily exit from the aircraft.

In a similar fashion, the pilot occupying the chair 26 may release his seat track locking pin 56 and push against the floor with his legs to slide the seat 26 rearward towards the area of the open doorway. When he is within easy arm reach of the latching pin 56 on the seat 30, he may reach back, lift the latch pin 56 and use his chair 26 to move both chair 26 and chair 30 to its rearmost position with respect to the tracks 18 and 20. Again, when the bumper plate 82 on the rear of the pilot seat 26 abuts the latch release plate 62 of the passenger seat 30, the upper platform 46 will be unlatched from the lower platform 38 and the seat assembly will be rotated upward about the hinge 48 by means of a spring. Again, the tipping up of the seat cushion 36 to the position shown by the phantom lines in FIG. 4 allows a further rearward travel of the pilot seat 26 so that the pilot's seat can be positioned conveniently next to the open doorway to allow easy exit.

In all instances, smooth and easy sliding of the seat assemblies is accomplished because of the manner in which the castors 40, 42 and 50 engage the tracks 18–20 and 22–24. Because of the manner in which the seats are disposed on tracks, it is unnecessary for the pilot or passengers to assume an erect position within the confines of the passenger compartment. Instead, the pilot and passengers are able to manipulate the seats, assume a seated position with respect thereto and then reposition the seats along the tracks 18–20 and 22–24.

While there has been shown and described a preferred embodiment of the present invention, various modifications and changes may occur to those skilled in the art. For example, the latch mechanisms 56 and 74 are illustrated in somewhat schematic form and may assume other configurations. Accordingly, the true scope of the invention is to be determined from the accompanying claims.

What is claimed is:

1. An aircraft seating arrangement comprising:
   (a) at least one pair of parallel, spaced apart tubular rails having a rectangular cross-section and having a longitudinal slot formed in the upper horizontal surface thereof and a plurality of spaced apart detent notches extending laterally from said slot, said rails being affixed to the floor of the passenger compartment of an aircraft fuselage and running longitudinally therealong;
   (b) a first generally rectangular platform having front and rear roller members attached in pairs to the undersurface of said first platform and along opposite side edges thereof and passing through said slot and into said tubular rails for cooperatively engaging said pair of rails allowing relative movement therealong;
   (c) a second platform hingedly attached to the rear edge of said first platform, said second platform having a seat cushion on the upper surface thereof and first and second additional roller members attached to the underside of said second platform at the forward edge thereof and engaging the outer upper surface of said tubular rail members when said second platform is in its position parallel to the upper surface of said first platform;
   (d) spring means disposed between said first and second platforms for rotating said second platform with respect to said first platform about said hinge attachment;
   (e) latch means for holding the lower surface of said second platform parallel to the upper surface of said first platform against the force of said spring means; and
   (f) means for releasably locking said seat frame to at least one of said pair of rails.

2. Apparatus as in claim 1 wherein said means for releasably locking said seat frame comprises:
   (a) a detent pin attached to the front edge of said second platform and adapted to cooperate with said laterally extending notches formed in said upper horizontal surface of said tubular member.

3. An aircraft seating arrangement comprising:
   (a) at least one pair of elongated rectangular cross-section tubular members disposed in the floor of the fuselage of said aircraft in parallel, spaced apart relationship to one another;
   (b) first and second seat frame assemblies, each including
      (1) a first generally rectangular platform member having wheels mounted on the under surface and along the lateral edges thereof, said wheels being at least partially enclosed within said tubular members,
      (2) a second generally rectangular platform having first and second wheels on the under surface thereof proximate the forward edge and along opposed sides thereof, said wheels on said second platform cooperating with the outer upper surface of said tubular members,
      (3) a hinge connecting the rearward edges of said first and second platforms,
      (4) a spring operatively disposed between said first and second platforms for causing rotation of said second platform with respect to said first platform about said hinge, and
      (5) latch means for normally latching said first and second platforms in a parallel relationship with respect to one another and with the floor of the fuselage,
   said first seat frame assembly being located along said pair of tubular members forward of said second seat from assembly;
   (c) a bumper element attached to the rear edge of said first seat frame assembly; and
   (d) latch release means positioned on the forward edge of said second seat frame assembly and longitudinally aligned with said bumper element for releasing said latch means when contacted by said bumper element.

* * * * *

UNITED STATES PATENT AND TRADEMARK OFFICE
CERTIFICATE OF CORRECTION

PATENT NO. : 4,157,797
DATED : June 12, 1979
INVENTOR(S) : Anthony Fox

It is certified that error appears in the above-identified patent and that said Letters Patent are hereby corrected as shown below:

Column 6, Line 51, "from" should read -- frame --.

*Signed and Sealed this*

*Twenty-eighth* Day of *August 1979*

[SEAL]

Attest:

LUTRELLE F. PARKER

*Attesting Officer*  *Acting Commissioner of Patents and Trademarks*